(12) United States Patent
Orr

(10) Patent No.: US 6,189,114 B1
(45) Date of Patent: Feb. 13, 2001

(54) DATA PROCESSING SYSTEM DIAGNOSTICS

(75) Inventor: Francis Martin Orr, Greenock (GB)

(73) Assignee: International Business Machines Corporation, Armonk, NY (US)

( * ) Notice: Under 35 U.S.C. 154(b), the term of this patent shall be extended for 0 days.

(21) Appl. No.: 09/105,653

(22) Filed: Jun. 26, 1998

(30) Foreign Application Priority Data

Aug. 8, 1997 (GB) .................................................. 9716789

(51) Int. Cl.⁷ .............................. G06F 11/22; G06F 9/445
(52) U.S. Cl. ................................................. 714/25; 713/2
(58) Field of Search .................................. 714/25, 27, 30, 714/36, 37, 44, 46, 48, 49, 57; 345/336; 713/1, 2

(56) References Cited

U.S. PATENT DOCUMENTS

| | | | |
|---|---|---|---|
| 4,953,165 | * 8/1990 | Jackson | 714/44 |
| 5,398,333 | 3/1995 | Schieve et al. | 395/575 |
| 5,455,933 | * 10/1995 | Schieve et al. | 714/27 |
| 5,491,791 | * 2/1996 | Glowny et al. | 714/37 |
| 5,623,673 | * 4/1997 | Gephardt et al. | 710/260 |
| 5,682,310 | * 10/1997 | Pedneau et al. | 710/261 |
| 5,944,839 | * 8/1999 | Isenberg | 714/26 |

\* cited by examiner

*Primary Examiner*—Robert W. Beausoliel, Jr.
*Assistant Examiner*—Christopher Revak
(74) *Attorney, Agent, or Firm*—Wayne Ellenbogen; Perman & Green, LLP

(57) ABSTRACT

A system and method provides remote diagnostics testing of a data processing system. Diagnostics testing code is stored in a non-volatile memory in the system. A diagnostic test indicator (e.g., in the form of flag in a CMOS RAM) is settable by a signal from a controlling computer system remote from the data processing system. The signal requests that diagnostics testing is to be performed on the data processing system. When the data processing system is rebooted, the CMOS flag is checked and if found to be set, the diagnostics code is invoked and diagnostic testing is performed. When the diagnostics testing is complete and results have been logged in the non-volatile storage, the code causes the flag to be reset and the data processing system to be rebooted. The results are transferred, on request, to the remote controlling computer system for analysis.

17 Claims, 4 Drawing Sheets

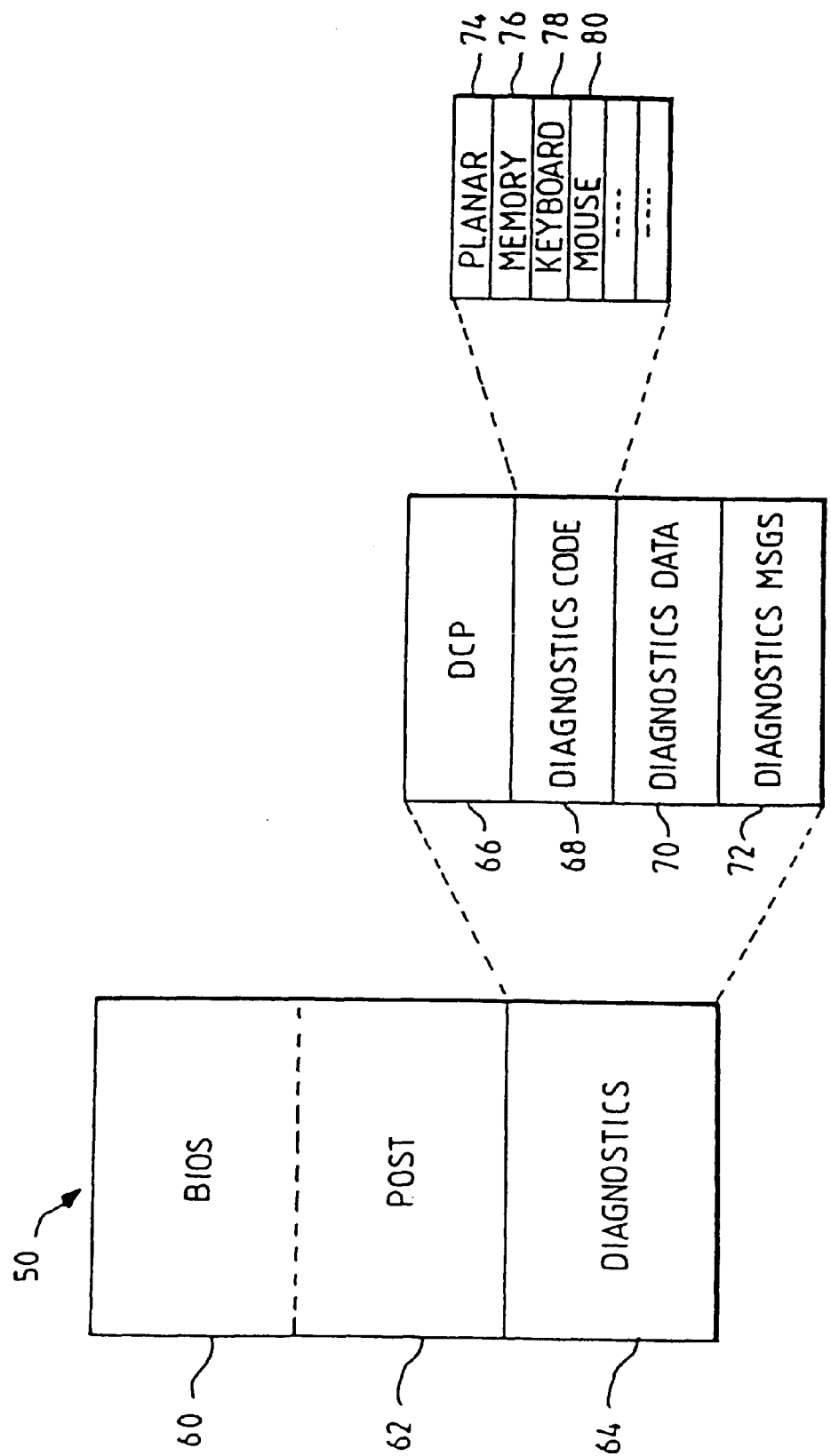

```
┌─────────────────────────────┐ ⟋ 85
│      DIAGNOSTIC  MODE       │
├─────────────────────────────┤
│  STOP ON ERROR      YES/NO  │
│  RESET RUN LIST     YES/NO  │
│  SINGLE RUN                 │
│  LOOP COUNT         [    ]  │
└─────────────────────────────┘
```

FIG. 3

```
┌─────────────────────────────┐ ⟋ 90
│         DIAGNOSTIC          │
├─────────────────────────────┤
│  RUN ALL DIAGNOSTICS     ☐  │
│  PLANAR TEST             ☐  │
│  MEMORY TEST             ☐  │
│  KEYBOARD TEST           ☐  │
│           ⋮                 │
│  MOUSE TEST              ☐  │
│  RUN SELECTED DIAGNOSTICS ☐ │
└─────────────────────────────┘
```

FIG. 4

DATA PROCESSING SYSTEM DIAGNOSTICS

BACKGROUND OF THE INVENTION

1. Field of the Invention

The present invention relates generally to diagnostic testing in a data processing system, and more specifically, to a non disk-based diagnostics procedure for use in a data processing system.

2. Description of Related Art

The complexity of modern-day data processing systems provides many benefits to the user. However, the variety and complexity of different components in the system can give rise to problems in diagnosing the source of a problem in the system. Accordingly, it is an ongoing requirement to provide for diagnostic testing of data processing systems, especially systems such as, for example, network file servers where a problem can lead to significant network downtime and/or loss of user data. Comprehensive diagnostic testing involves exercising the operation of many different components of the system in order to determine the cause of a fault.

The most common type of diagnostics is disk-based where the diagnostics program is stored on either a hard disk drive or a floppy disk drive. The diagnostics program is retrieved from the disk drive and executed on the computer under the control of an operation system. One limitation of disk-based diagnostics programs is that in order to run the diagnostics program, the computer needs functioning components such as the disk drive, a keyboard, a central processing unit (CPU), a memory and a monitor. Therefore, disk-based diagnostics programs can only be used when the necessary components of the computer are functioning. However, it is commonly the case that the faults to be diagnosed prevent the computer from booting (initiating start-up operations) in the first place.

In order to diagnose such faults, therefore, a second type of diagnostics program is incorporated in the computer firmware. This type of diagnostics is referred to as a ROM-based diagnostics program because the diagnostics program is stored in a read-only memory (ROM), or similar type of non-volatile memory. One well known type of ROM-based diagnostics program used in personal computers is called a power-on self test (POST) diagnostics program which is stored in the system BIOS (basic input output system). The POST is executed each time the computer powers-on in order to check the presence and operation of various critical computer components.

The POST is, however, limited in its capabilities for two main reasons. First, as it executes at every power-on, it is designed to have a rapid execution time in order that the computer user is not significantly delayed before the computer is available for use. Second, the space available in system ROM BIOS for the POST diagnostics program is severely limited.

An example of a ROM-based diagnostics program is described in U.S. Pat. No. : 5,398,333, issued Mar. 14, 1995, entitled "Personal Computer Employing Reset Button To Enter ROM-Based Diagnostics", by Schieve et al. The method employed by Schieve et al. comprises storing a diagnostics routine in ROM, monitoring the status of a reset button coupled to the personal computer and executing the diagnostics routine if the reset button is pressed twice within a predefined period of time.

One problem common to the prior art disk-based and ROM-based diagnostics programs is the need for the person initiating the diagnostics program to be physically located at the computer to be tested, either to insert a diagnostics diskette or, in the case of the system disclosed by Schieve et al., to press the computer reset button. If the person initiating the diagnostics needs to test a number of systems which may be at different locations, the process can be substantially time-consuming and inefficient.

In view of the disadvantages of the prior art device described above, it can be appreciated that it would be desirable to provide an improved technique for performing diagnostic testing of a data processing system, such as file server system, which overcomes these disadvantages.

OBJECTS AND ADVANTAGES OF THE INVENTION

It is a first object and advantage of this invention to provide a diagnostics testing technique that overcomes the foregoing and other problems.

It is another object and advantage of this invention to provide a nondisk-based diagnostics testing technique.

It is a further object and advantage of this invention to provide a remotely initiated, non-disk based diagnostics testing technique.

Further objects and advantages of this invention will become more apparent from a consideration of the drawings and ensuing description.

SUMMARY OF THE INVENTION

The foregoing and other problems are overcome and the objects of the invention are realized by methods and apparatus in accordance with embodiments of this invention, wherein an improved diagnostics testing technique is provided. In a first aspect of the present invention, a data processing system is provided which includes a non-volatile memory having code stored therein for performing diagnostic tests on portions of the system. The data processing system includes diagnostic test indicator means settable by a signal from a controlling computer system remote from the computer system requesting that diagnostics are to be performed on the data processing system. Also included are means operable, during a reboot of the data processing system, to check the status of the indicator means and, on a determination that diagnostics are to be performed, to cause the execution of the diagnostic test code from the non-volatile memory.

According to a second aspect of the invention, there is provided a method of performing remotely-initiated diagnostic testing of a data processing system. The data processing system includes a non-volatile memory for storing diagnostics test code operable to perform diagnostic tests on the data processing system. A method of the present invention includes steps of: in response to a command from a remote computer system requesting performance of diagnostic testing, setting diagnostic indicator means in the data processing system; on power-on of the data processing system, checking the status of the indicator means; and on a determination that the indicator means is set, executing the diagnostics test code.

Thus, the present invention provides a non-disk based procedure and system for permitting remotely-initiated testing of a data processing system (for example, a file server of a computer network). In the non-disk based system a remote control computer, at the behest of a system administrator, issues a command to the data processing system to set indicator means, preferably in the form of a flag in CMOS RAM, to indicate that, on the next power-on, the data processing system is to execute diagnostic code held in the non-volatile memory in the system. The non-volatile memory in which the code is stored is preferably flash ROM. However, the diagnostic code may reside in a standard EEPROM, a flash EEPROM or indeed CMOS RAM as long as the RAM retains the diagnostic code when the system is powered down.

In a preferred arrangement, the diagnostics code includes a plurality of modules, each designed to test the function of a component or subassembly of the system. In such an arrangement, the system and method of the present invention are preferably enhanced by providing the means to allow the remote computer to define which diagnostic modules are to be executed during testing. In response to a set-up command from the remote computer specifying which module or modules are to be executed, a run list is defined in the data processing system. This run list is stored in CMOS RAM.

During execution of the diagnostic tests, the results are temporarily held in a system buffer before they are transferred to non-volatile storage in the system. In one preferred arrangement, all the test results are held in non-volatile storage. In another preferred arrangement, only error information is held in storage.

It may be convenient, in some circumstances, for the system administrator to physically visit the tested system(s) to gain access to the diagnostic results. In a preferred system and method, however, the diagnostics code executing on the data processing system is enhanced to permit the remote computer to access the diagnostic results. This is achieved by resetting the flag in the CMOS RAM or the like and by causing the data processing system to reboot on completion of the diagnostics testing. At the end of POST, the flag is checked and, as it has been reset, the system continues with a normal boot procedure to load the computer operating system. When the system is functional, it is responsive to a request from the remote computer to transfer the diagnostic results to the remote computer for subsequent analysis.

Thus, as will be described below in relation to the preferred embodiment of present invention, there is provided a system and method for initiating remote diagnostic testing of a data processing system. The diagnostics test code is stored in flash ROM in the system. A diagnostic test indicating means (e.g., in the form of flag in CMOS RAM) is settable by a signal from a control computer system remote from the computer system requesting that diagnostics are to be performed on the data processing system. When the data processing system is rebooted, in response to a signal from the control computer, the CMOS flag is checked and if found to be set, the diagnostics code is invoked and diagnostic testing is performed. When the diagnostic tests are complete and results have been logged in non-volatile storage, the code causes the flag to be reset and the data processing system to be rebooted. The results are transferred, on request, to the remote system for analysis.

The present invention thus allows for the convenient remote-initiation of ROM-based diagnostic testing for computer systems, such as, for example, personal computers or file servers. This advantage is especially apparent in the situation where the remote control computer is configured to communicate with a number of different data processing systems at different sites. By means of the present invention, the system administrator can initiate remote diagnostics programs at many systems and retrieve the results as a time convenient to the administrator and to the owners of the systems to be tested.

A preferred embodiment of the present invention will now be described, by way of example only, with reference to the accompanying drawings.

BRIEF DESCRIPTION OF THE DRAWINGS

The above set forth and other features of the invention are made more apparent in the ensuing Detailed Description of the Invention when read in conjunction with the attached Drawings, wherein:

FIG. 2 shows the contents of the system ROM of FIG. 1 according to one embodiment of the present invention;

FIG. 3 shows a first display screen presented to the user of the control computer in accordance with one embodiment of the present invention;

FIG. 4 shows a second screen of a graphical user interface presented to the user of the control computer in accordance with one embodiment of the present invention.

Identically labelled elements appearing in different ones of the above described figures refer to the same elements but may not be referenced in the description for all figures.

DETAILED DESCRIPTION OF THE INVENTION

In the following, the remote diagnostic testing procedures according to the present invention are performed on a file server computer system. It can be appreciated that the invention is also applicable to testing other data processing systems including, for example, personal computers and client systems in a network.

Figure 1:
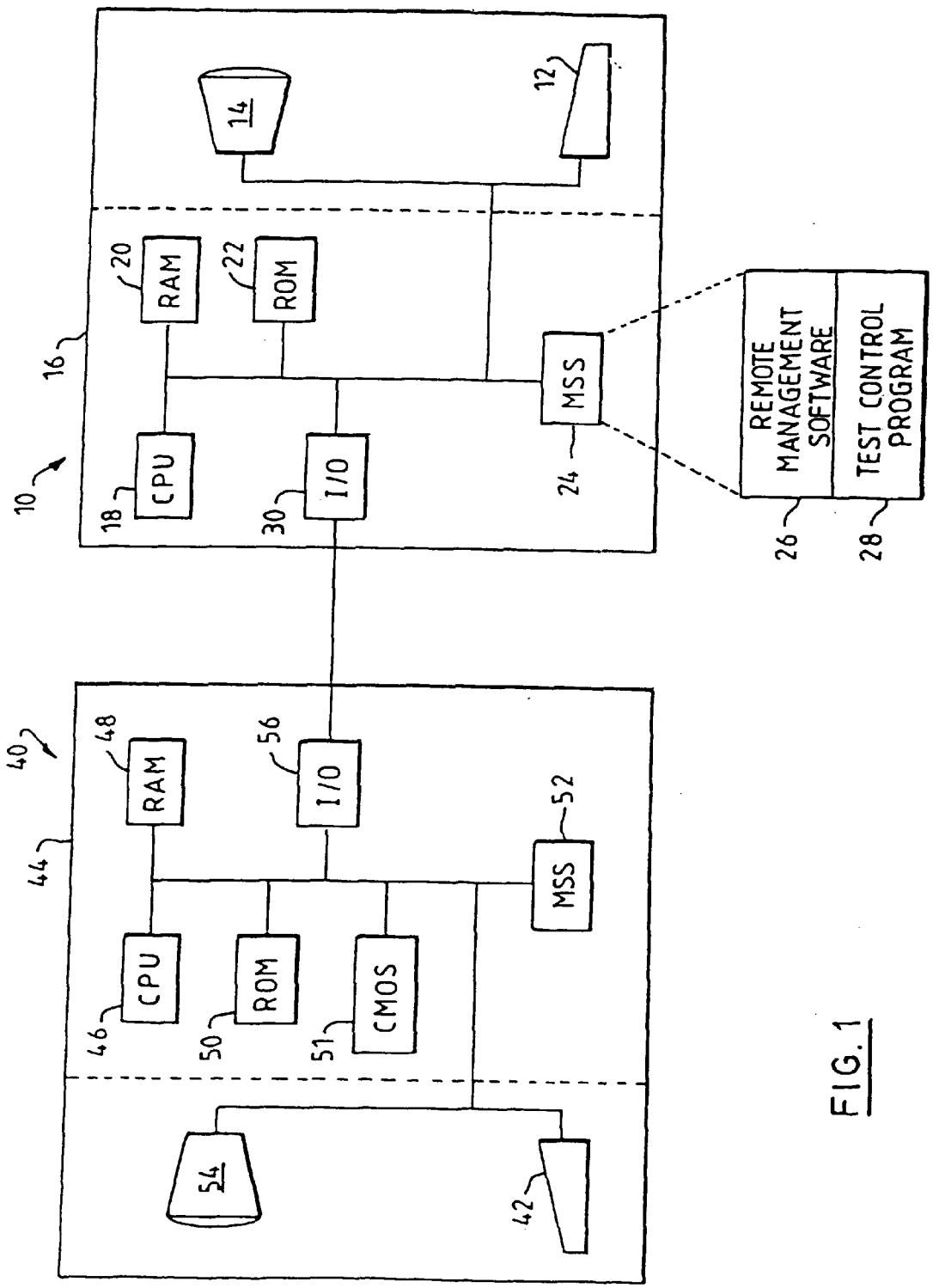
FIG. 1 is a block-diagrammatical representation of a server system and a connected remote control computer employed in the preferred embodiment of the present invention.

With reference therefore to FIG. 1 there is shown a file server system 40 connected to a control computer 10. The control computer 10 and the file server system 40 form part of the same local-area network or, alternatively, the controlling system 10 is in a different location and connected to the server system 40 by means of a public telephone or dedicated link. In the present invention, the control computer 10 is employed by a system administrator to remotely initiate diagnostic testing of the connected server system 40.

The control computer 10 is constituted as a conventional computer workstation having, for example, a keyboard 12 and a display 14 attached to a system unit 16. The system unit includes, for example, a CPU 18, a random access memory (RAM) 20, a read only memory (ROM) 22 and a hard disk drive 24 on which is stored remote control software 26 and test control software 28 by means of which the system administrator can control various operations of the server system 40. One example of server management software suitable for communication with the server system 40 in the present invention is the IBM NetFinity management software which operates in peer-to-peer mode to communicate with the server system 40 via I/O 30. In the Netfinity arrangement, code for issuing and responding to remote management requests is present on the control computer 10 and on the server system 40, respectively. Tasks or requests initiated at the control computer 10 are processed by the code at the server 40 and thence to the ROM code in the server system 40.

The file server system 40 includes, for example, a keyboard 42 attached to a system unit 44 including a main CPU 46, system RAM 48, system flash ROM 50, CMOS RAM 51 and mass storage capability 52. The mass storage capability 52 is typically in the form of multiple magnetic disk drives constituted in a RAID (redundant array of independent disks) arrangement. Stored on the server mass storage devices 52 are a variety of different types of software including, for example, operating system software and application software for downloading to client systems connected to the file server 40. The server system 40 may optionally include a display 54 and other storage devices such as a diskette drive and CD-ROM drive (not shown). The file server 40 communicates with the control computer 10 via I/O 56 which may take the form of an adapter card.

With reference now to FIG. 2, residing in the system flash ROM 50 of the server 40 is system BIOS 60 for providing, in the conventional manner, an interface between the operating system software and the server hardware. Comprising one portion of the system BIOS 60 is the power-on self test code (POST) 62 which is employed at power-on to detect and to check the proper operation of various components of the server system 40. In accordance with the present invention, the flash ROM 50 further includes a diagnostic program 64 which, when invoked, performs diagnostic testing of the server system 40. As described above, the diagnostics program 64 is designed to perform detailed testing of various components of the server system 40 at the request of the system administrator. In comparison, the tests performed at POST 62 are initiated automatically at power-on and during execution are necessarily limited to confirming the presence and basic operation of the system components.

The diagnostics program 64 comprises, for example, a number of components including a diagnostics control program (DCP) 66, diagnostics code 68 and diagnostics data 70. As will be described below, the DCP 66 controls the diagnostic testing and, in particular, the execution of the diagnostics code 68. The diagnostics code 68 comprises, for example, a number of diagnostic modules 74, 76, 78 and 80 each of which is defined to test a component or subassembly of the server system 40. For example, the code 68 may include modules for testing the proper operation of the system planar, the keyboard, the memory, the video, the diskette, and the mouse etc. Optionally, the diagnostics program 64 also includes diagnostics text messages 72 for use in identifying errors reported during the diagnostics test procedure. In order to conserve space in the flash ROM 50, the diagnostics software is stored in compressed form.

With further reference to FIG. 1, the server system 40 further includes non-volatile memory in the form of the CMOS RAM 51, hereinafter referred to as a CMOS 51, which as in the conventional manner, stores various system configuration parameters used during the initialization of the server 40 during POST 62. As is conventional, the power required to maintain the set-up data in CMOS 51 is supplied by, for example, a battery (not shown).

In order to perform the remote diagnostics of the present invention, a diagnostic boot procedure is defined which is invoked during POST 62 if diagnostic testing is to be performed. In order to cause a diagnostic boot to be performed, a flag is defined in the CMOS 51 which is set by the remote control management software 26 when the system administrator wishes diagnostic testing to be performed at the server 40. When the server 40 is rebooted (cold boot), toward the end of power-on self test (POST), the POST code 62 checks whether this CMOS flag is set for remote diagnostics. If so, the POST 62 does not continue by invoking the conventional operating system boot procedure, but rather invokes a diagnostic handler which unpacks the diagnostics program 64 from the flash ROM 50 into the system RAM 48. If the flag is not set for remote diagnostics, the server 40 continues to boot-up the system in the conventional manner by loading the operating system from the mass storage 52.

As has been mentioned, the diagnostics flag in the CMOS 51 is set in response to a command issued by the control computer 10. In order to allow the control computer 10 to set the flag in the CMOS 51, an interface is provided to the server system BIOS 60 defining a number of the ROM diagnostic functions which may be called by the remote management software 26. These functions are called via a software interrupt. As will be described below, one such function acts on a call from the control computer 10 to set the flag in the CMOS 51. Further functions allow the control computer 10 to define a run list of diagnostic modules to be executed at the next invocation of the diagnostics program 64. For example, the system administrator may be aware of a server problem which is likely to reside in the operation of the system planar or memory, in which case the run list can be defined to include only the planar and memory diagnostic modules 74 and 76, respectively. The runlist parameters are stored in the CMOS 51.

Provided at the control computer 10 is a test control program 28 which interfaces with the remote management software 26 in order to allow the system administrator to easily initiate the diagnostic testing on the server system 40. A succession of screens (e.g., in Windows, OS/2, or Windows NT format, depending on the operation system at the control computer 10) are presented to the administrator to allow various options to be chosen. Two of these screens are shown in FIGS. 3 and 4.

FIG. 3 shows the screen 85 for defining the diagnostic mode. The various options include:

Stop-on Error

This is a yes/no option which if selected causes the DCP 66 to stop execution of the diagnostic code 68 when an error is reported. The error is stored in non-volatile storage for subsequent analysis.

Reset Run List

This is a yes/no option which if selected clears any previously selected module from the run list stored in the CMOS 51.

Single Run

If chosen, the selected modules are only run once each.

Loop Count

The diagnostic modules, for example, the planar module 74 and the memory module 76 of the diagnostic code 68, can be run multiple times. The loop count option allows the administrator to specify the number of iterations of these multiple runs.

FIG. 4 shows the screen 90 for selecting the diagnostic modules to be included in the run list. Thus, the administrator can choose to run all modules or to run selected modules. The remote management software 26 takes the selections made on screen 90 and calls the ROM Diagnostics interface which in turn causes the run list to be defined in the CMOS 51.

Figure 5:
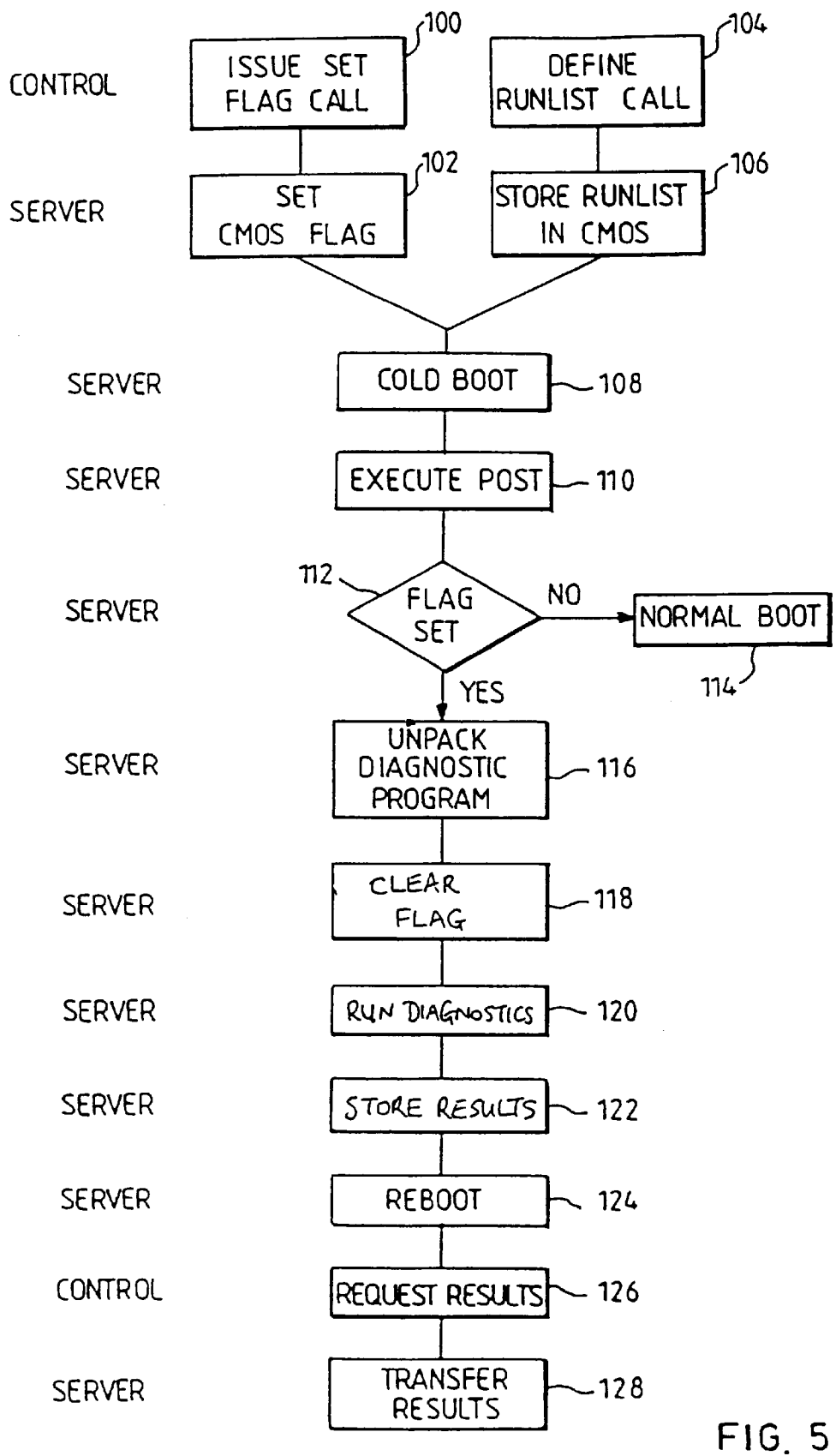
FIG. 5 is a flow chart showing the setup and execution of the system diagnostics according to the preferred embodiment of the invention.

Next will be described, with reference to FIG. 5, the process by which the control computer 10 sets-up a diagnostic test and by which the server computer 40 performs the diagnostics.

At the instigation of the system administrator, the control computer 10, by means of the remote management software 26, issues a command to the server system 40 to cause the CMOS diagnostics flag to be set (step 100). This command is processed by the server 40 and through the appropriate ROM diagnostics function, the CMOS flag is set (step 102). Optionally, the control computer 10 may wish to define or re-define the run list of diagnostic modules to be invoked (step 104) in which case the appropriate ROM diagnostics function is called and the run list is stored in the CMOS 51 (step 106).

The control computer 10 then issues a command to cause the server system 40 to restart with a cold boot (step 108). At reboot, the server system 40 executes self-test procedures by means of the POST program 62 stored in the flash ROM 50 (step 110). Towards the end of POST 62, when most of the system components have been identified and checked, the POST 62 checks the flag in the CMOS 51 (step 112). If the flag is not set, the server system 40 continues with the normal boot procedure (step 114). If the flag is set, a setup routine is invoked which causes the unpacking of the diagnostics program 64 from the flash ROM 50 into the system RAM 48 (step 116). The diagnostics control program 66 (DCP) then assumes control and resets the CMOS flag (step 118). In accordance with the defined run list, the parameters of which are transferred to the DCP 66 from the CMOS 51, the DCP 66 then runs the selected diagnostic modules, for example, the planar module 74 and the memory module 76 of the diagnostic code 68 (step 120). The results of the diagnostic tests are stored in a results buffer (e.g., within the flash ROM 50) in the server 40 (step 122). For example, the results buffer is a linked list of sessions that contain a linked list of the results from each of the diagnostic modules. Errors detected during the diagnostic testing are stored in an error log located in non-volatile memory, for example, the CMOS 51, for later access by the control computer 10. The error log advantageously includes details of the error including, for example, a basic error code, failing data, an address and optionally an appropriate text message from one of the diagnostic messages 72 stored in the RAM 48.

The DCP 66 then causes the server 40 to reboot (step 124). On request from the control computer 10 (step 126), the server 40 transfers the logged results, i.e. the error log, to the control computer 10 for analysis (step 128).

Although described in the context of preferred embodiments, it should be realized that a number of modifications to these teachings may occur to one skilled in the art. By example, and as discussed above, the teachings of this invention are not intended to be limited to any specific hardware or software configuration.

While the invention has been particularly shown and described with respect to preferred embodiments thereof, it will be understood by those skilled in the art that changes in form and details may be made therein without departing from the scope and spirit of the invention.

What is claimed is:

1. A data processing system comprising:
   a non-volatile memory having code stored therein for performing diagnostics testing on portions of said data processing system;
   diagnostic test indicator means settable by a signal from a controlling computer system remote from said data processing system, said signal requesting that diagnostics testing is to be performed on said data processing system; and
   means, operable during power-on of said data processing system, to check a status of said indicator means and on a determination that diagnostics testing is to be performed, to cause the execution of said diagnostics testing code from said non-volatile memory.

2. A data processing system as set forth in claim 1, wherein said diagnostics testing code comprises a plurality of modules, each of said plurality of modules being designed to test an operation of a component of said data processing system.

3. A data processing system as set forth in claim 2, wherein said plurality of modules to be executed during diagnostics testing are defined in response to a set-up command from said remote controlling computer system.

4. A data processing system as set forth in claim 3, wherein said set-up command from said remote controlling computer system defines a run list of selected ones of said plurality of modules to be executed during diagnostics testing, said run list being stored in said non-volatile memory of said data processing system.

5. A data processing system as set forth in claim 1, wherein said non-volatile memory further comprising means for storing results generated during execution of said diagnostics testing code.

6. A data processing system as set forth in claim 5, wherein during execution of said diagnostics testing code, said diagnostics test indicator means is reset to define a normal system boot at next power-on.

7. A data processing system as set forth in claim 6, wherein when said diagnostics testing is completed and said results are stored, said diagnostics testing code causes said data processing system to execute a system re-boot.

8. A data processing system as set forth in claim 7, wherein on completion of said system re-boot, said data processing system is responsive to a request from said remote controlling computer system to transfer said diagnostic results from said non-volatile memory to said remote controlling computer system.

9. A data processing system as set forth in claim 1, wherein said diagnostic test indicator means comprises a flag in a CMOS RAM.

10. A data processing system as set forth in claim 1, wherein said non-volatile memory is a flash ROM.

11. A method of performing remotely-initiated diagnostic testing of a data processing system, the data processing system including non-volatile memory for storing diagnostics testing code operable to perform diagnostics testing on the data processing system, the method comprising steps of:
    in response to a command from a remote computer system requesting performance of diagnostics testing, setting diagnostic indicator means in the data processing system;
    on power-on of the data processing system, checking a status of the indicator means; and
    on a determination that the indicator means is set, executing the diagnostics testing code.

12. A data processing system comprising:
    a non-volatile memory having code stored therein for performing diagnostics testing on portions of said data processing system;
    remote controller means for setting a diagnostic test indicator on said data processing system,; and
    means to check during power-on, the status of said diagnostic test indicator and on a determination that diagnostics test indicator has been set, to cause the execution of said diagnostics testing code from said non-volatile memory, wherein said non-volatile memory further comprising means for storing results generated during execution of said diagnostics testing code.

13. A data processing system as set forth in claim 12, wherein during execution of said diagnostics testing code, said diagnostics test indicator means is reset to define a normal system boot at next power-on.

14. A data processing system as set forth in claim 13, wherein when said diagnostics testing is completed and said results are stored, said diagnostics testing code causes said data processing system to execute a system re-boot.

15. A data processing system as set forth in claim 14, wherein on completion of said system re-boot, said data processing system is responsive to a request from said remote controlling computer system to transfer said diagnostic results from said non-volatile memory to said remote controller means.

16. A data processing system as set forth in claim 12, wherein said diagnostic test indicator means comprises a flag in a CMOS RAM.

17. A data processing system as set forth in claim 12, wherein said non-volatile memory is a flash ROM.

* * * * *